(12) United States Patent
Sughrue et al.

(10) Patent No.: US 8,729,322 B2
(45) Date of Patent: May 20, 2014

(54) HYDROTREATING CARBOHYDRATES

(75) Inventors: Edward L. Sughrue, Bartlesville, OK (US); Jianhua Yao, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 935 days.

(21) Appl. No.: 12/849,109

(22) Filed: Aug. 3, 2010

(65) Prior Publication Data

US 2011/0046423 A1    Feb. 24, 2011

Related U.S. Application Data

(60) Provisional application No. 61/236,347, filed on Aug. 24, 2009.

(51) Int. Cl.
C07C 1/00 (2006.01)

(52) U.S. Cl.
USPC ............... 585/240; 585/242; 44/605; 208/57; 208/62

(58) Field of Classification Search
USPC ....................... 585/14, 240, 242; 44/605, 606; 568/863; 208/57, 62
See application file for complete search history.

(56) References Cited

U.S. PATENT DOCUMENTS

| | | | |
|---|---|---|---|
| 3,997,427 A | 12/1976 | Eng et al. | |
| 4,338,472 A | 7/1982 | Sirkar | |
| 4,496,780 A | 1/1985 | Arena | |
| 4,503,278 A | 3/1985 | Chen et al. | |
| 4,992,605 A * | 2/1991 | Craig et al. | 585/240 |
| 5,180,868 A | 1/1993 | Baker et al. | |
| 5,705,722 A * | 1/1998 | Monnier et al. | 585/240 |
| 5,959,167 A | 9/1999 | Shabtai et al. | |
| 6,291,725 B1 | 9/2001 | Chopade et al. | |
| 6,479,713 B1 | 11/2002 | Werpy et al. | |
| 6,570,043 B2 * | 5/2003 | Elliott et al. | 568/863 |
| 6,787,023 B1 | 9/2004 | Mohr et al. | |
| 6,841,085 B2 | 1/2005 | Werpy et al. | |
| 7,550,634 B2 * | 6/2009 | Yao et al. | 585/240 |
| 7,626,063 B2 * | 12/2009 | Ghonasgi et al. | 585/276 |
| 7,678,950 B2 * | 3/2010 | Yao et al. | 585/240 |
| 7,781,626 B2 * | 8/2010 | Pham et al. | 570/164 |
| 7,872,165 B2 * | 1/2011 | Bertoncini et al. | 585/240 |

(Continued)

FOREIGN PATENT DOCUMENTS

WO    9910450    3/1999

OTHER PUBLICATIONS

Chianelli, et al., "Periodic trends in hydrodesulfurization: in support of the Sabatier principle", Applied Catalysis, A, vol. 227, pp. 83-96 (2002).

(Continued)

*Primary Examiner* — Nina Bhat
(74) *Attorney, Agent, or Firm* — Phillips 66 Company (57) ABSTRACT

Conversion of renewable hydrocarbons to transportation fuels is required to reduce carbon emission, limit the use of fossil fuels, and develop renewable energy sources. Sorbitol, xylitol and trehelose are polyalcohols generated from the liquefaction of various sugars and carbohydrates in biomass from algae, corn, sugarcane, switchgrasses, and biological wastes. Mixtures of aqueous polyols and fuel feedstocks are catalyzed over metal catalysts to produce hexanes, pentanes, and lighter hydrocarbons. By managing the catalyst, reaction conditions and sulfur content, the octane value of the product fuel is dramatically increased.

21 Claims, 2 Drawing Sheets

(56) References Cited

U.S. PATENT DOCUMENTS

| | | | | |
|---|---|---|---|---|
| 8,053,615 | B2* | 11/2011 | Cortright et al. | 585/240 |
| 8,067,657 | B2* | 11/2011 | Duarte Santiago et al. | 585/733 |
| 8,193,399 | B2* | 6/2012 | Gosling | 585/14 |
| 8,198,486 | B2* | 6/2012 | Cortright | 568/403 |
| 8,288,599 | B2* | 10/2012 | Yanik et al. | 585/240 |
| 8,366,910 | B2* | 2/2013 | Roberto Gomes et al. | 208/89 |
| 2006/0186020 | A1* | 8/2006 | Gomes | 208/46 |
| 2007/0142633 | A1 | 6/2007 | Yao et al. | |
| 2009/0166256 | A1* | 7/2009 | Lewis et al. | 208/89 |

OTHER PUBLICATIONS

Davda, et al., "A Review of Catalytic Issues and Process Conditions for Renewable Hydrogen and Alkanes by Aqueous-Phase Reforming of Oxygenated Hydrocarbons Over Supported Metal Catalysts," Appl. Catal. B., 56, 171 (2004).

Hamada and Watabe, "More Propylene in FCC Units" Catalyst Research Center, JGC Catalysts and Chemicals Ltd. (2008).

Huber, et al., "Renewable Alkanes by Aqueous-Phase Reforming of Biomass-Derived Oxygenates'" Angew. Chem. Int. Ed., 43, 1549 (2004).

Huber, et al.; "Production of Liquid Alkanes by Aqueous-Phase Processing of Biomass-Derived Carbohydrates", Science, 308, 1446-1450 (2005).

Metzger, "Production of Liquid Hydrocarbons from Biomass," Angew. Chem. Int. Ed., 45, 696 (2006).

\* cited by examiner

HYDROTREATING CARBOHYDRATES

PRIOR RELATED APPLICATIONS

This application is a non-provisional application which claims benefit under 35 USC §119(e) to U.S. Provisional Application Ser. No. 61/236,347 filed Aug. 24, 2009, entitled "HYDROTREATING CARBOHYDRATES," which is incorporated herein in its entirety.

FIELD OF THE DISCLOSURE

The present disclosure generally relates to methods and apparatus for the processing of polyol and fuel feedstocks to fuel products. Aqueous polyols from biomass liquefaction including sorbitol, xylitol, trehalose, sucrose, oils, lipids, and other byproducts of liquefaction are hydrotreated with fuel feedstocks including diesels, kerosene, fuel oil, and the like to generate high octane gasoline fuel products. By co-processing polyol feedstocks with diesel fuels, less expensive commercial grade catalysts may be used on a commercial scale at increased temperatures and pressures while remaining active and without fouling.

BACKGROUND OF THE DISCLOSURE

Processes to convert renewable resources into transportation fuels usually involve several steps. For example, one approach is to use acids to convert carbohydrates, starches, lignins, and other biomass into sugars such as glucose, lactose, fructose, sucrose, dextrose. The catalytic hydrogenation of the carbonyl groups of a sugar like glucose ($C_6H_{12}O_6$) can then produce a polyalcohol including sorbitol ($C_6H_{12}O_6$).

There has been a significant effort to produce lower polyols through catalytic hydrotreating of aqueous sorbitol. Various Group VIII metal hydrotreating catalysts have been discussed including nickel (U.S. Pat. No. 4,338,472), ruthenium (U.S. Pat. No. 4,496,780, U.S. Pat. No. 6,291,725), and rhenium (U.S. Pat. No. 6,479,713, U.S. Pat. No. 6,841,085). Alditols including 15-40 wt % sorbitol solution in water are catalytically hydrocracked between 400° to 500° F. and hydrogen partial pressure from 1200 to 2000 psig in a fixed bed catalytic reactor using nickel catalyst to produce at least 30 wt % conversion to glycerol and glycol products (U.S. Pat. No. 4,338,472). An alkali promoter such as calcium hydroxide or sodium hydroxide was added to the feedstream solution to control pH, prevent nickel leaching and enhance conversion. Sorbitol was hydrocracked over a supported Group VIII noble metal catalyst with an alkaline earth metal oxide; such ruthenium on a titanium alumina support with barium oxide between 300° to 480° F. at 500 to 5000 psig to produce lower polyols such as glycerol, ethylene glycol, 1,2-propanediol (U.S. Pat. No. 4,496,780). High molecular weight polyols including sugar alcohols such as sorbitol or xylitol in water with a base promoter underwent hydrogenolysis over a metal catalyst of ruthenium deposited on an alumina, titania, or carbon support between 350° to 480° F. at 500 to 2000 psig hydrogen to produce low molecular weight polyols including glycerol, propylene glycol, and ethylene glycol (U.S. Pat. No. 6,291,725). Five carbon sugars and sugar alcohols including 15-40 wt % sorbitol, and lactic acid were hydrocracked with hydrogen over a rhenium catalyst in water to achieve at least 30 wt % conversion to glycerol and glycol products between 400° and 500° F., between 1200 and 2000 psig hydrogen, and a liquid hourly space velocity of 1.5 to 3.0 (U.S. Pat. No. 6,479,713). Battelle (2005) reacts an aqueous solution of sorbitol with hydrogen over a multi-metallic rhenium catalyst, including Re and Ni, at 250°-375° F. to produce propylene glycol through hydrogenolysis of C—O and C—C bonds (U.S. Pat. No. 6,841,085). These methods are limited by size, temperature, products, and conversion rates. Unfortunately at higher temperatures and higher catalytic activity, these reactions become quickly fouled. The catalyst must be removed and replaced before sufficient volumes of fuel are processed. Thus, these reactions must be improved to meet a commercial production scale and cost effectiveness.

Some advances have been made toward the catalytic conversion of sorbitol to alkanes. Huber, et al., (2004) used Palladium, Silica, and Alumina catalysts to convert sorbitol to a stream of alkanes including butane, pentane, and hexane. Incorporating hydrogenation of reaction intermediates with produced hydrogen increased yield. David, et al. (2004) assayed conditions for the production of hydrogen and/or alkanes from renewable feeds including aqueous solutions of sorbitol. In a review, Metzger (2006) notes alkane production from aqueous phase sorbitol reforming is improved with a bi-functional catalyst including a metal (Pt, Pd, or the like) and acid including silica alumina with the co-production of $H_2$ and $CO_2$. Although the yield of alkanes could be increased up to 98% when hydrogen was co-fed with the aqueous sorbitol stream they were able to reduce $CO_2$ production, increasing $H_2O$ production and pathway efficiency.

Many of the processes above do not remove oxygen, require expensive catalysts, are subject to fouling, and are not scalable to production levels required. Additionally, processing biomass as a common feedstock is hindered by short catalyst lifetime, increased pressures and temperatures, increased production of coke byproducts, and increased corrosiveness. These undesirable side-effects hinder mass production of renewable fuels from biomass. Although noble metals have been used for hydrotreating at lower temperatures, these expensive catalysts do not alleviate the problem of fouling and the reactions are difficult to perform on a commercial scale. A method of converting large quantities of biomass is required that does not damage catalysts and equipment during the refining process.

BRIEF DESCRIPTION OF THE DISCLOSURE

Hydrotreating a mixture of sorbitol and diesel over a commercial hydrotreating catalyst produces lighter alkanes and hexanes desirable for gasoline fuels. Additionally, these methods can be modified to increase production of high octane methyl-cyclopentane (MCP) instead of n-hexane (HEX). Production of MCP dramatically increases the octane value of the product, thus commercial quantities of sorbitol are converted to hydrocarbons that can be blended directly into a valuable gasoline stream.

"Catalysts" as described herein are commercial grade hydrotreating catalysts used by petroleum industries in refining processes. Most metals catalyze hydrotreating including transition metals such as cobalt, molybdenum, nickel, titanium, tungsten, zinc, antimony, bismuth, cerium, vanadium, niobium, tantalum, chromium, manganese, rhenium, iron, cobalt, and the noble metals including platinum, iridium, palladium, osmium, rhodium and ruthenium (Chianelli, 2002) along with other metal compounds. Binary combinations of cobalt and molybdenum, nickel and molybdenum, and nickel and tungsten are also highly active. Commercial grade catalysts include Cobalt-Molybdenum (Co/Mo), Nickel-Molybdenum (Ni/Mo), Titanium-Molybdenum (Ti/Mo), Nickel-Tungsten (Ni/W), Cobalt (Co), Molybdenum (Mo), Copper (Cu), Iron (Fe), combinations thereof and other commercially available hydrotreating catalysts. Noble metal catalysts, including Platinum (Pt), Palladium (Pd), and Ruthenium (Ru) catalysts may also be used. One of ordinary skill in the art may select a catalyst based on composition, structure and charge to achieve specific activity from the catalyst. Although selection of a catalyst and activity is highly predictable because the reaction is based on the surface structure of the catalyst, the rate of reaction and overall productivity may vary dependent upon the reactants, reaction conditions, and flow rate.

Commercial refining catalysts are readily available from a variety of sources including ALBEMARLE, ADVANCED REFINING TECHNOLOGIES (ART), PGM CATALYSTS & CHEMICALS, AMERICAN ELEMENTS, EURECAT, FISCHER, HALDOR TOPSOE, HEADWATER, SIGMA, and other chemical suppliers. Catalysts are supported on an alumina, silica, titania, zeolite, carbon or other support materials. Catalysts may be microsized, nanosized, fluidized or other catalyst forms dependent upon the reactor size, shape and conditions under which the reaction is run. The catalysts may also be a highly active catalyst including unsupported Co/Mo, Co/W, Ni/Mo, Ni/W, Ti/Mo, Ti/W, Co/Mo/W, Ni/Mo/W, Ti/Mo/W and the like are used for hydrotreating polyols to yield increased hexanes, pentanes, cyclopentanes and other higher octane products. In one embodiment a Co/Mo catalyst on alumina support is used in mixed bed reactors. In another embodiment, a Ni/Mo catalyst on a solid alumina support is used for continuous flow through reactions. Additionally, a Co/Mo catalyst on a zeolite support may be used. Highly active, unsupported Ni/Mo, Co/Mo, or combinations of Ni/Mo and Co/Mo catalysts may also be used in a commercial fuel oil refinery to process mixed polyols.

Fuel oil feedstocks include a variety of fuels including fuels in the diesel boiling range. Additionally other fuel feedstocks may be used for processing including jet fuel, kerosene, diesel fuel, heating oil, and fuel oils. Diesel fuels include petro-diesel, bio-diesel, synthetic diesel, blended diesel, and the like. Market price and availability are used to determine the fuel feedstock of choice. Typically the fuel with the lowest overall cost including direct cost, transportation, process modification, processing and any other costs that may be associated with the fuel oil feedstock.

Sugar feedstocks consist of one or more polyols in an aqueous solution. Polyols include glycerol, sorbitol, xylitol, and the like. Liquefaction of biomass typically produces monoglyceride feedstocks containing sorbitol and xylitol. Feedstocks may contain from about 50 to about 98% v/v polyol. In one embodiment a polyol feedstock contains approximately 30%, 35%, 40%, 45%, 50%, 55%, 60%, 65%, 70%, 75%, 80%, 85%, 90%, 95%, up to 98% sorbitol, xylitol and mixtures of sorbitol and xylitol. Although sorbitol feedstock comprises sorbitol and aqueous solution, additional polyols, oils, and sugars are present after liquefaction. Many isomers, polymers, and soluble sugars are present in the aqueous liquefaction fraction. Hydrotreating will convert many of these to valuable fuel products (Table 1).

TABLE 1

Polyols and their products.

| Polyol | Carbons | Oxygens | Product |
| --- | --- | --- | --- |
| Glycol | 2 | 2 | Ethane |
| Glycerol | 3 | 3 | Propane |
| Erythritol | 4 | 4 | Butane |
| Threitol | 4 | 4 | Butane |
| Arabitol | 5 | 5 | Pentane |
| Ribitol | 5 | 5 | Pentane |
| Xylitol | 5 | 5 | Pentane |

TABLE 1-continued

Polyols and their products.

| Polyol | Carbons | Oxygens | Product |
| --- | --- | --- | --- |
| Allitol | 6 | 6 | Hexane |
| Dulcitol | 6 | 6 | Hexane |
| Galactitol | 6 | 6 | Hexane |
| Iditol | 6 | 6 | Hexane |
| Mannitol | 6 | 6 | Hexane |
| Sorbitol | 6 | 6 | Hexane |
| Isomalt | 12 | 11 | Hexane |
| Lactitol | 12 | 11 | Hexane |
| Maltitol | 12 | 11 | Hexane |
| Trehalose | 12 | 11 | Hexane |

Figure 1:
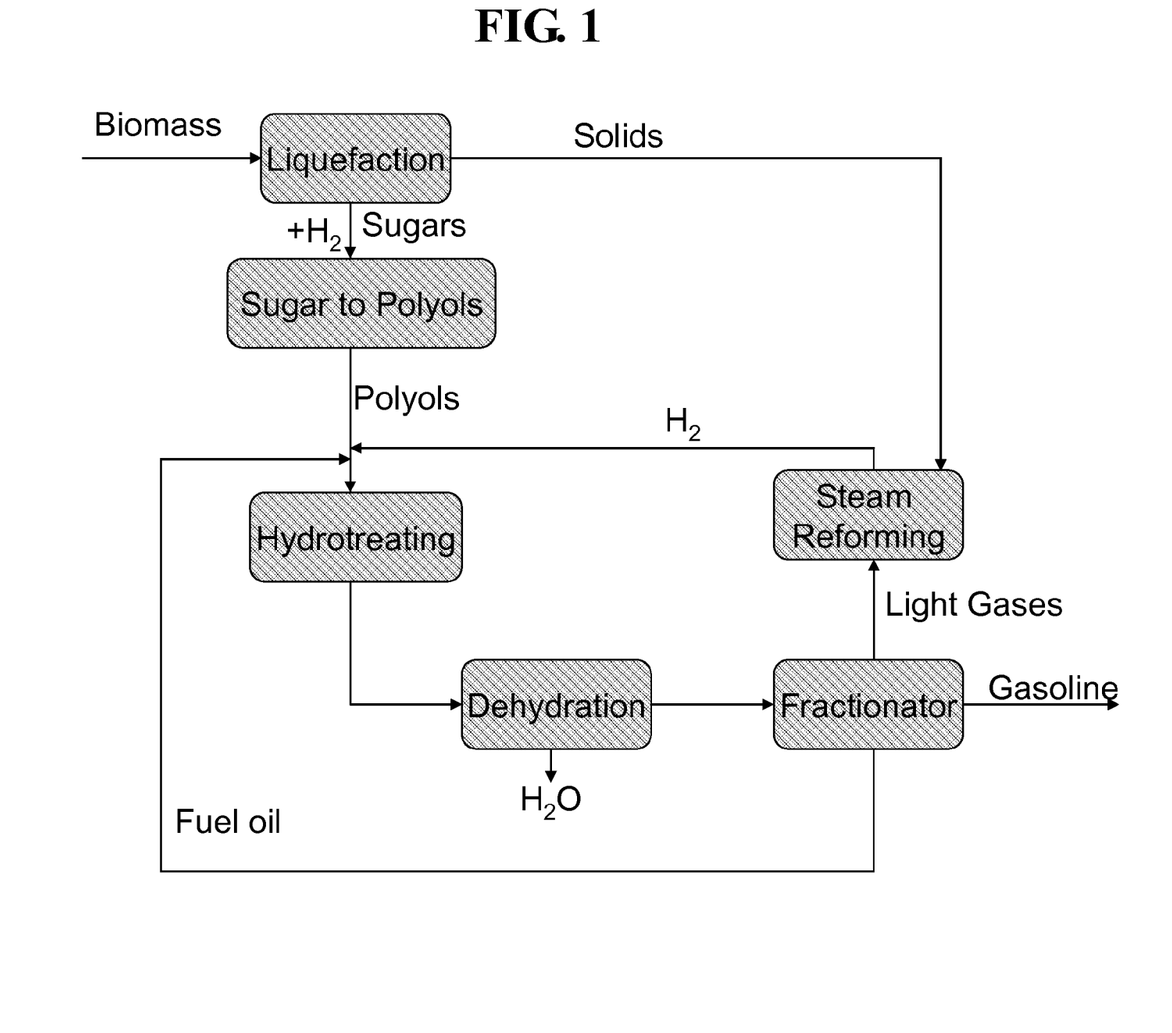
FIG. 1: Self Contained Process for Hydrotreating of Carbohydrates to Fuel
Figure 2:
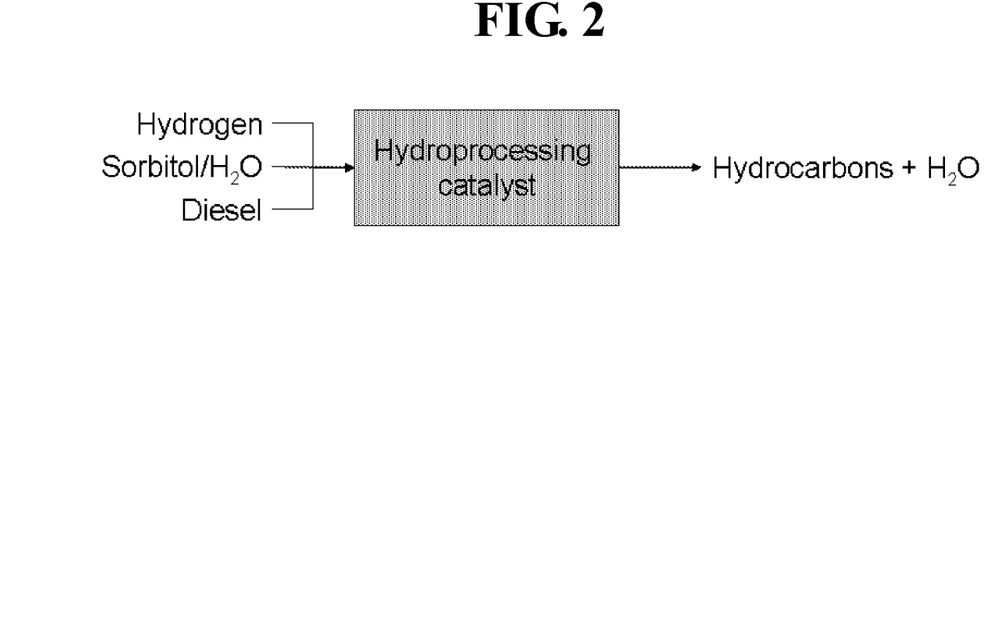
FIG. 2: Hydrotreating reactants and products.

Light gasses include methane, ethane, butane, isobutane, propane, pentane and mixtures thereof. Light gases produced during hydrotreating may be processed into individual or mixed products such as methane, ethane, propane, butane, compressed natural gas (CNG), natural gas liquids (NGL), liquefied petroleum gas (LPG), liquefied natural gas (LNG), or transferred to reforming for hydrogen generation with biomass solids (FIG. 1).

MATERIALS AND METHODS

Sorbitol feedstock was processed in the presence of diesel feedstock at between 400-1000° F. and between about 150 to about 3000 psi. Sorbitol feedstock contains approximately 70% v/v sorbitol in aqueous solution. Sorbitol feedstock may range from about 50 to about 100% v/v sorbitol. A typical sorbitol solution often contains between 30 and 80% v/v sorbitol and many sorbitol solution are approximately 30% v/v, 35% v/v, 40% v/v, 45% v/v, 50% v/v, 55% v/v, 60% v/v, 65% v/v, 70% v/v, 75% v/v, 80% v/v, 85% v/v, 90% v/v, or 95% v/v sorbitol. Pure sorbitol may also be processed, but because of the hygroscopic nature it is usually found at less than 98% v/v sorbitol unless dried. Because the sorbitol feedstock is the product of a variety of reactions often derived from biomass the final sorbitol concentrations are quite variable.

Diesel feedstock is commonly a mixture of diesel range hydrocarbon products from a hydrotreater. Diesel may also be supplied through a variety of sources either within or delivered to the refinery. In one aspect, diesel products remaining after biodiesel processing are recycled to the gasoline fuel production. Sulfur present in some diesel feeds is used as a renewable catalyst donor for diesel feeds with moderate to high sulfur content. Diesel feedstocks commonly contain between approximately 15 and 1500 ppm sulfur compounds. Sulfur content may get as high as 1% w/v for high sulfur diesels. For low sulfur diesels, the diesel feed is spiked with a very small amount of mercaptan or other renewable donor. In one embodiment the diesel feed is spiked with about 0.1 to about 1.0% w/v sulfur containing compound. In another embodiment the diesel feed is spiked with about 0.25 to about 0.5% w/v sulfur containing compound. In one embodiment the sulfur content is raised to above 1000 ppm.

A variety of sulfur compositions may be used to increase sulfur content of the diesel feedstock. Examples of sulfur compounds include, but are not limited to, hydrogen sulfide, carbonyl sulfide (COS), carbon disulfide (CS2), mercaptans (RSH), organic sulfides (R—S—R), organic disulfides (R—S—S—R), thiophene, substituted thiophenes, organic trisulfides, organic tetrasulfides, organic polysulfides, benzothiophene, alkyl thiophenes, dibenzothiophene, alkyl benzothiophenes, alkyl dibenzothiophenes, and the like, and mixtures thereof as well as heavier molecular weights of the same, wherein each R can be an alkyl, cycloalkyl, or aryl group containing 1 to about 10 carbon atoms. These include mercaptan, dimethyl sulfide, hydrogen sulfide, dimethyl polysulfides, mercaptoethanol, mercaptobutanol, 2-mercaptoethyl sulfide, mercaptopropanol, 3-mercapto-2 methyl propanol, mercaptopentanol, thioglycerine, dithiothreitol, and other sulfur compositions may be used. Typically a sulfur composition is selected based on cost, quantity, availability, and chemical properties. In most cases a more soluble sulfur compound is selected that makes sulfur available for catalytic activity. In some cases a less soluble compound is used to maintain active sulfur compounds over a longer period of time, for greater volumes, or under varying reaction conditions.

Biological polyol hydrotreating is described where
a) a polyol feedstock is mixed with a fuel oil feedstock to form a reaction mixture,
b) the reaction mixture (a) reacts in the presence of a hydrotreating catalyst, and
c) produces a mixture of light gasses, gasolines, carbon monoxide, and carbon dioxide.

Biomass is converted to gasoline by:
a) liquefying biomass to generate a polyol feedstock,
b) mixing the polyol feedstock with a fuel oil feedstock to form a reaction mixture,
c) the reaction mixture (a) reacts in the presence of a hydrotreating catalyst, and
d) produces a mixture of light gasses, gasolines, carbon monoxide, and carbon dioxide.

Biomass may also be converted to gasoline by:
a) liquefying biomass to generate a polyol feedstock and biomass solids
b) mixing the polyol feedstock with a fuel oil feedstock to form a reaction mixture,
c) hydrotreating the reaction mixture (b) in the presence of a hydrotreating catalyst,
d) produces a mixture of light gasses, gasolines, carbon monoxide, and carbon dioxide, and
e) reforming biomass solids (a) and light gasses (d) to generate $H_2$ and $CO_X$. The $H_2$ generated by reforming biomass and light gasses provides a hydrogen feed for the hydrotreating reaction.

Polyol feedstocks for the hydrotreating reactions are aqueous solutions containing a variety of biological compounds including Glycol, Glycerol, Erythritol, Threitol, Arabitol, Ribitol, Xylitol, Allitol, Dulcitol, Galactitol, Iditol, Mannitol, Sorbitol, Isomalt, Lactitol, Maltitol, Trehalose, and combinations thereof.

Fuel oil feedstocks include gasoline, jet fuel, kerosene, heating oil, fuel oils, diesel fuel, petro-diesel, bio-diesel, synthetic diesel, blended diesel, and combinations thereof. Hydrotreating catalyst include cobalt (Co), molybdenum (Mo), nickel (Ni), titanium (Ti), tungsten (W), zinc (Zn), antimony (Sb), bismuth (Bi), cerium (Ce), vanadium (V), niobium (Nb), tantalum (Ta), chromium (Cr), manganese (Mn), rhenium (Re), iron (Fe), platinum (Pt), iridium (Ir), palladium (Pd), osmium (Os), rhodium (Rh), ruthenium (Ru), bimetallic catalysts (Co/Mo, Ni/Mo, Ni/W, Ti/Mo, Ti/W) and mixtures of the above catalysts.

The hydrotreating process can be conducted at an approximate temperature of about 400° F., 425° F., 450° F., 475° F., 500° F., 525° F., 550° F., 575° F., 600° F., 625° F., 650° F., 675° F., 700° F., 725° F., 750° F., 775° F., 800° F., 825° F., 850° F., 875° F., or 900° F. Temperature across the reaction vessel may vary by 10 to 50° F. Fahrenheit temperatures (° F.) may be converted to Celsius (° C.) through a simple conversion ($T_C=0.56(T_F-32)=5/9(T_F-32)$) thus 400° F. is approximately 200° C., and 1000° F. is approximately 540° C. The hydrotreating process may be conducted at an approximate temperature of about 200° C., 225° C., 250° C., 275° C., 300° C., 325° C., 350° C., 375° C., 400° C., 425° C., 450° C., 475° C., and 500° C. Temperature across the vessel may vary by about 5 to 25° C. dependent upon the volume or size of the reaction vessel, thermal conductance of the vessel material, heat capacity of the reaction and other reaction conditions.

The reaction occurs at an approximate pressure of 500, 550, 600, 650, 700, 750, 800, 850, 900, 950, 1000, 1050, 1100, 1150, 1200, 1250, 1500, 1750, 2000, 2250, 2500, 2750, and 3000 psig. The reaction pressure may be expressed in terms of 1 atm=1.01325 bar=101.3 kPa=14.696 psi (lbf/in2)=760 mmHg=10.33 mH2O=760 torr=29.92 inHg=1013 mbar=1.0332 kgf/cm2=33.90 ftH2O. Thus a gauge pressure (g) of 500 psig is equivalent to approximately 25 atm. Pressures during hydrotreating may vary dependent upon the viscosity, flow rates, catalyst density, temperature, air pressure, and other factors. The pressure may vary from 10-50 psig at lower pressures or 50-250 psig at higher pressures. Thus a reaction at 500 psig may be at approximately 500° psig, but pressures may vary between 450 psig and 550 psig. A reaction at about 3000 psig may vary between 2750 psig and 3250 psig during the course of the reaction. Temporary spikes or drops in pressure will not dramatically reduce overall activity of the hydrotreating process.

DETAILED DESCRIPTION OF EMBODIMENTS OF THE INVENTION

Conversion of renewable hydrocarbons to transportation fuels is required to reduce carbon emission, limit the use of fossil fuels, and develop renewable energy sources. Sorbitol, $C_6H_{14}O_6$, is a polyalcohol prepared by the catalytic hydrogenation of the carbonyl groups of glucose ($C_6H_{12}O_6$) when biomass carbohydrates undergo liquefaction.

Previously, we have used a ZSM-5 zeolite catalyst to convert a sorbitol/water/isopentane mixture to gasoline hydrocarbons (US2007142633, incorporated by reference in its entirety), from 400° F. to 1100° F. with approximately 1 to 100 psig. Typical yield was about 28 wt % $C_2$-$C_4$ olefins, 16 wt % $CO_X$, 51 wt % $C_5$+ and 5 wt % $C_1$-$C_4$ paraffins. About 83% of the liquid product was aromatic, mainly $C_7$ or $C_8$. Increasing pressure increased sorbitol conversion to $C_1$-$C_4$ paraffins and $C_5$+ while decreasing $C_2$-$C_4$ olefins, coke, and $CO_X$ production. In addition, increased pressure removed oxygen from sorbitol as water with isopentane acting as the hydrogen donor.

Additionally, ConocoPhillips has developed a split injection sugar alcohol conversion process, U.S. Ser. No. 61/250, 633, filed Oct. 12, 2009 that describes coinjection of diesel and sugar alcohols to reduce coking.

Catalysts include Cobalt-Molybdenum on alumina catalyst. Other catalyst such as Nickel-Molybdenum on alumina or noble metals such as Pt, Pd, and Ru make hexane from sorbitol. Catalysts including the KETJEN® Co/Mo catalyst were obtained from ALBEMARLE (1030 BE Amsterdam, The Netherlands) unless otherwise specified. A variety of catalysts may be obtained from ALBERMARLE™, including highly active catalysts, supported catalyst, and custom catalysts with a variety of activities and properties.

Reactions were conducted by mixing the polyol and fuel oil feedstock prior to contacting the catalysts. Polyol feedstocks contained a variety of sorbitol and xylitol concentrations in aqueous solution. Unless otherwise stated, a 70% sorbitol solution in water was used as a polyol feedstock. The fuel oil feedstock was a hydrocarbon mixture in the diesel boiling range obtained from the hydrotreater as available during processing. The diesel feed was spiked with a very small amount of dimethyl sulfide.

Hydrotreating various polyol feedstocks, like sorbitol, xylose and trehalose, with a fuel oil feedstock allows the co-production of gasoline from biomass and fuel oils simultaneously. In one embodiment, biomass is treated with acids to produce sugars, sugar alcohols, and other carbon compounds including sorbitol, xylitol and trehalose. By hydrotreating these oxygenated carbon compounds excellent transportation fuels are generated using standard refinery equipment with minor adjustments to ensure quality products and equipment longevity.

The present invention will be better understood with reference to the following non-limiting examples.

Example 1

Hydrotreating Sorbitol to Hexanes/Alkanes

Experiments indicate that hydrotreating a mixture of an aqueous solution of sorbitol and diesel over a commercial hydrotreating catalyst produces hexanes and lighter hydrocarbons. Tests were run over a commercially available Co/Mo catalyst on an alumina support with a feed consisting of 70% sorbitol in water mixed with diesel spiked with a small concentration of dimethyl sulfide. One run had temperature at 700° F. and pressure at 900 psig; another had temperature at 600° F. and pressure at 1200 psig.

TABLE 2

| Hydrotreating Sorbitol | |
|---|---|
| Temperature (° F.) | 700 |
| Pressure (psig) | 900 |
| Sorbitol conversion % | 99.9 |
| Products (C mol %) | |
| $C_1$-$C_4$ | 28.1 |
| $C_5^+$ | 67.1 |
| $CO + CO_2$ | 4.8 |

Reaction conditions: 20 ml/hr Diesel + 10 ml/hr sorbitol solution (70% sorbitol/30% water), 700° F., 900 psig, 300 ml/min $H_2$, 25 g Co/Mo catalyst.

Bench scale tests were run over a commercial Co/Mo on alumina catalyst with a polyol feedstock consisting of 70% sorbitol in water solution and a fuel oil feed comprising diesel range hydrocarbons. The diesel feed was spiked with a small concentration of dimethyl sulfide to keep the catalyst sulfided, a requirement for maintaining its activity. Polyol and fuel oil feedstocks were mixed in a 2:1 ratio. Dimethyl sulfide addition can be eliminated when sulfur-containing diesel is used. Sorbitol was converted to hydrocarbons and $CO_x$, (mixed CO and $CO_2$). When the temperature was 700° F. (~370° C.) and the pressure was 900 psig ( ), the sorbitol conversion was essentially 100% with products consisting of 28.1 C mole % C1-C4, 67.1 C mole % C5+, and 4.8 C mole % COx.

TABLE 3

| Pressure effects | | | |
|---|---|---|---|
| | Pressure (psig) | | |
| | 1200 | 800 | 600 |
| Conversion % | 99.9 | 99.9 | 99.8 |
| Products (C mol %) | | | |
| $C_1$-$C_4$ | 20.4 | 20.6 | 24.0 |
| $C_5^+$ | 78.0 | 77.3 | 73.7 |
| $CO + CO_2$ | 1.5 | 2.1 | 2.3 |

Catalyst: 25 g Co/Mo catalyst;
Feed: 20 ml/hr Diesel feedstock + 10 ml/hr sorbitol solution.

Reactions were tried at a variety of temperatures to ensure maximum conversion and to confirm that catalyst failure did not occur. By comparing 600, 800, and 1200 psig, it was demonstrated that the diesel/sorbitol feeds could operate above 1000 psig. There was minimal effect on product distribution when reaction pressure was greater than 800 psig. The reaction was active across all pressure ranges with increased C5+ selectivity above 800 psig. At 1200 psig more C5+ gasoline products and less $CO_x$ was produced. There was no fouling or reduced activity between 600 and 1200 psig.

TABLE 4

| Catalyst selection | | | |
|---|---|---|---|
| | Conversion (%) | Selectivity (% to C5+) | Temp (° F.) |
| Highly Active Catalyst 1 | 99.8 | 82 | 522 |
| Commercial Catalyst 2 (Co/Mo) | 99.7 | 72 | 558 |
| Commercial Catalyst 3 (Co/Mo) | 99.8 | 61 | 554 |
| Commercial Catalyst 4 (Co/Mo) | 99.8 | 71 | 600 |

Reaction conditions: 2:1 Diesel to 70% Sorbitol feedstock, 1200 psig, 300 ml/min $H_2$, total catalyst.

A variety of catalyst formats were tried to determine if catalyst activity was affected by support type or catalyst source. These catalysts were analyzed for gasoline generation using 2:1 fuel oil to polyol feedstock at 1200 psig with 300 ml/min $H_2$. Although a variety of Co/Mo catalyst types were tried, including commercially available highly active catalysts (1) as well as solid alumina supported catalysts, activity remained high and a large portion of the sorbitol was converted to C5+ hydrocarbons. The source of Co/Mo catalyst did not affect overall activity with over 99% conversion for each catalyst. The highly active catalyst produced the greatest amount of C5+ products, greater than 80%.

TABLE 5

| Catalyst stability | | | | |
|---|---|---|---|---|
| | Days | | | |
| | 4 | 5 | 45 | 47 |
| Conversion (%) | 99.8 | 99.9 | 99.8 | 99.7 |
| Products (C mol %) | | | | |
| $C_1$-$C_4$ | 17.7 | 20.0 | 19.4 | 19.1 |
| $C_5^+$ | 81.3 | 78.8 | 79.0 | 80.1 |
| $CO + CO_2$ | 1.0 | 1.2 | 1.6 | 0.8 |

Reaction conditions: 2:1 Diesel to Sorbitol feedstock, 560° F., 1200 psig, 300 ml/min $H_2$, Albemarle catalyst.

To ensure the catalysts were stable, the ALBEMARLE catalyst was run with continuous feed for several months to ensure stability. Using an highly active catalyst, no deactivation occurred for over ~45 days operation at approximately 560° F. with about 1200 psig. The diesel to sorbitol feedstock ratio was 2:1 and greater than 99% of sorbitol in the reaction was converted to products. Consistently, nearly 100% of the sorbitol feedstock was converted to about 80% gasoline fuels ($C_5+$), about 20% light gases ($C_1$-$C_4$), and about 1-2% carbon monoxide/carbon dioxide.

Example 2

Hydrogen Production

A steady supply of hydrogen is required for the hydrotreating process of sugar alcohols to gasoline hydrocarbons. Although hydrogen may be available from other sources, it is frequently expensive and energy intensive. To improve the efficiency and decrease the cost of hydrotreating biomass polyols, $H_2$ is produced in a separate reactor by steam reforming the light gases produced from hydrotreating sorbitol and diesel.

Although hydrotreating requires excess H2 for an efficient reaction, there was a minimal effect found as long as the mole ratio of $H_2$/sorbitol was greater than about 12 mol $H_2$ per mol sorbitol in the feed (Table 6).

TABLE 6

Hydrogen/Sorbitol Determination.

| | H2/Sorbitol mole ratio | | |
|---|---|---|---|
| | 25 | 12.5 | 6.2 |
| Conversion % | 99.7 | 99.9 | 98.8 |
| Selectivity (C mol %) | | | |
| $C_1$-$C_4$ | 18.6 | 20.5 | 12.9 |
| $C_5^+$ | 81.0 | 78.0 | 79.6 |
| CO + $CO_2$ | 0.4 | 1.5 | 7.5 |

Reaction conditions: Catalyst: 25 g Co/Mo catalyst;
Feed: 20 ml/hr Diesel feedstock + 10 ml/hr sorbitol solution.

The fuel oil and sugar alcohol feedstocks were mixed prior to contacting the catalysts. The sugar alcohol feedstock was a 70% sorbitol in water solution. The fuel oil feedstock was mixture of hydrocarbons in the diesel boiling range. The diesel feed was spiked with a very small amount of dimethyl sulfide. The hydrotreating was done at conditions normally used for petroleum diesel hydrotreating, 25 g Co/Mo catalyst; Feed: 20 ml/hr Diesel feedstock+10 ml/hr sorbitol solution. Approximately 99% of the sorbitol was converted to carbon products when H2 was supplied at greater than 6 mol $H_2$ per mol sorbitol. With greater than 99.5 percent of the sorbitol converted to carbon products with greater than 12 mol $H_2$ per mol sorbitol. Thus gasoline products were produced under all reaction conditions with 6 mol or greater $H_2$ per mol sorbitol.

An economical source for $H_2$ is available from the light gas stream and biomass solids. Lighter alkanes are steam reformed to produce hydrogen required for hydrogenation of the carbohydrates during the refining process. By generating the hydrogen in situ from refinery byproducts, the process is independent of outside sources of hydrogen. The steam reforming is accomplished in a separate reactor from the hydrogenation. Carbohydrates, biomass, and other feedstocks may be steam reformed in this process to increase hydrogen production or utilize excess feedstocks. Different parameters can be controlled like temperature, pressure, feed rates, steam to carbon ratios, and the like.

$$C_nH_mO_k + (2n-k)H_2O \rightarrow nCO_2 + (2n+m/2)-k)H_2$$

Thus, by utilizing the biomass solids and light gasses for hydrogen generation, the majority of the starting material may be converted to gasoline fuel products, $H_2O$ and $CO_X$. Biomass solids remain after biomass is treated with acids to generate a polyol feedstock. Light gases produced from hydrotreating provide a fuel and carbon source for steam reforming. Steam reforming produces heat, $H_2$, and $CO_X$ for use in the fuel production process.

Example 3

Increasing Octane

Octane rating or Research Octane Number (RON) is dependent upon the type of fuels produced and quantity of each in the final mixture. A fuel of pure HEX has a research octane rating of approximately 25 while pure MCP has a research octane rating of approximately 90. Mixtures of HEX and MCP can have octane ratings between 25 and 90 RON.

Polyol and diesel feedstocks were mixed before contacting with a Co/Mo catalyst on alumina support. Polyol feedstock containing approximately 70% sorbitol was mixed with a fuel feedstock mixture from a diesel hydrotreater. The low sulfur diesel feedstock mixture was spiked with a very small amount of dimethyl sulfide.

The ratio of MCP to HEX increases from 0.12 to 0.60 for run at 600° F. and 1200 psig compared to run at 700° F. and 900 psig. Raising the temperature to 700° F. and above produces methyl cyclopentane in place of normal hexane. This dramatically increases the octane value of the product. The process requires temperatures near 700° F. and pressures between 200 and 2000 psi. Sorbitol and diesel were co-fed to Co/Mo catalyst and results below showed that more methylcyclopentane (MCP) was produced at higher temperature (700° F.)

TABLE 7

Sorbitol hydrotreating

| Sorbitol | Diesel | Dimethyl sulfide | Catalyst. | ° F. | PSIG | HEX | MCP | RON |
|---|---|---|---|---|---|---|---|---|
| 70% | 29% | 0.07% | Co/Mo | 600 | 1200 | 89% | 11% | ~32 |
| 70% | 29% | 0.07% | Co/Mo | 700 | 900 | 62% | 38% | ~50 |

Reaction conditions:
Catalyst: 25 g Co/Mo catalyst;
Feed: 20 ml/hr Diesel feedstock + 10 ml/hr sorbitol solution.

An atomic emission detection of oxygen (AED-O) measured oxygen content at less than ~20 ppm for final products of the above reactions. This indicates that nearly all of the oxygen was removed from the polyol reactants. Additionally, no catalyst leaching was detected in any of the above reactions. Inductively Coupled Plasma (ICP) spectrometer readings indicate that metal levels for catalyst components, including Ni, Mo, or Co, were very low in the aqueous phase product. Levels for Co were less than 0.123 ppm, Ni were less than 0.216 ppm, and Mo were less than 0.024 ppm in final aqueous phase. This indicates that under high octane reaction conditions producing greater than 35% MCP, less than 20 ppm remained in polyols and less than 1 ppm of the catalyst was leached. Or, in other words, the reaction converted most of the reactants to products without damaging the catalyst.

Example 4

Commercial Scale Production

Raw feedstocks provided from biomass liquefaction (uncharacterized polyol feedstock) and a fuel oil feedstock (uncharacterized from a diesel hydrotreater or one of numerous commercial fuel oil feedstocks) are supplied to a continuous feed reactor containing a fixed bed highly active Ni/Mo, Co/Mo or mixture of Ni/Mo and Co/Mo catalyst. The coproduction of polyols with fuel oil feedstocks requires that mixed reactants are used as starting feedstocks. Reactions with catalysts were tested using mixed feedstocks (Table 8).

TABLE 8

| | Feed components | | |
|---|---|---|---|
| | Polyol | | |
| | Sorbitol | Xylitol | Xylitol + Sorbitol |
| Conversion (%) | 99.86 | 99.85 | 99.54 |
| Products (C mol %) | | | |
| $C_1$-$C_4$ | 20.0 | 22.8 | 19.0 |
| $C_5^+$ | 78.8 | 76.1 | 79.3 |
| $CO + CO_2$ | 1.2 | 1.2 | 1.7 |

Reaction conditions: 2:1 Diesel to Sorbitol feedstock, 560° F., 1200 psig, 300 ml/min $H_2$, total catalyst;
Catalyst: Commercial hydrotreating catalyst Reactors were tested with C5 or C6 polyols and a mixture of C5/C6 polyols. The hydrogenation of polyols with individual and mixed polyols converted over 99.5% of the initial polyol feedstock to fuel products. Greater than 75% of the polyol was converted to C5+ gasoline fuel products. After demonstrating that polyol carbon length did not affect reaction rates or productivity, dehydrated polyols were investigated to determine the effect of rings and/or branched polyols (Isosorbide) on the reaction (Table 9).

TABLE 9

| | Feed components | |
|---|---|---|
| | Polyol | |
| | Sorbitol | Isosorbide |
| Conversion (%) | 99.86 | 99.85 |
| Products (C mol %) | | |
| $C_1$-$C_4$ | 20.0 | 22.8 |
| $C_5^+$ | 78.8 | 76.1 |
| $CO + CO_2$ | 1.2 | 1.2 |

Reaction conditions: 2:1 Diesel to Sorbitol feedstock, 610° F., 1200 psig, 300 ml/min $H_2$, total catalyst;
Catalyst: Commercial Co/Mo Sorbitol and isosorbide were nearly identical under the reaction conditions used. Greater than 99.5% of the starting polyols were converted to fuel products. Thus neither polyol length, branching or ring structure decreased the hydrotreating process.

Hydrotreating sugar alcohols to hydrocarbons allows production of standard fuel products from biomass feeds, specifically mixed polyol feedstocks. Feed contaminants are removed, including non-soluble sugars, acids, other organics, metals, and water as required. Volumes and reaction sizes are directly scalable up to commercial grade refinery reactions conducted at rates exceeding 5,000, 12,000, 15,000, 50,000 BPSD or more. Because standard Co/Mo, Ni/Mo, or Ni/W catalysts are used, reactor volume and amount of catalyst required will not be prohibitive. Mixed feeds, including biomass liquefaction feedstock and diesel range hydrotreater feedstocks are used to generate gasoline through hydrotreating.

By using the biomass solids and light gas to generate hydrogen, a majority of the biomass is converted directly to useable fuel products. The production of gasoline from a mixture of diesel and biomass sugars creates transportation fuels inexpensively while incorporating renewable fuels into current markets. Although the systems and processes described herein have been described in detail, it should be understood that various changes, substitutions, and alterations can be made without departing from the spirit and scope of the invention as defined by the following claims.

REFERENCES

All of the references cited herein are expressly incorporated by reference. Incorporated references are listed here for convenience:

1. U.S. Pat. No. 4,338,472, "Catalytic Hydrogenolysis of Alditols to Produce Polyols" Hydrocarbon Research Inc. (1985).
2. U.S. Pat. No. 4,496,780, "Hydrocracking of Polyols," UOP Inc., Arena (1985).
3. U.S. Pat. No. 4,503,278, "Process for converting carbohydrates to hydrocarbons," Mobil Oil Corp., Chen and Koenig (1985).
4. U.S. Pat. No. 6,291,725, "Catalysts and Process for Hydrogenolysis of Sugar Alcohols to Polyols," Battelle, (2001).
5. U.S. Pat. No. 6,479,713, "Hydrogenolysis of 5-Carbon Sugars, Sugar Alcohols, and Other Methods and Compositions for Reactions Involving Hydrogen" Battelle, (2002).
6. U.S. Pat. No. 6,787,023, "Metal-containing macrostructures of porous inorganic oxide, preparation thereof, and use" ExxonMobil Patents, Mohr, et al. (2004).
7. U.S. Pat. No. 6,841,085, "Hydrogenolysis of 6-Carbon Sugars and Other Organic Compounds" Battelle, (2005).
8. US2007142633, "Process for Converting Carbohydrates to Hydrocarbons" ConocoPhillips, (2007).
9. Chianelli, et al., "Periodic trends in hydrodesulfurization: in support of the Sabatier principle", Applied Catalysis, A, volume 227, pages 83-96 (2002).
10. David, et al., "A Review of Catalytic Issues and Process Conditions for Renewable Hydrogen and Alkanes by Aqueous-Phase Reforming of Oxygenated Hydrocarbons Over Supported Metal Catalysts," Appl. Catal. B., 56, 171 (2004).
11. Hamada and Watabe, "More Propylene in FCC Units" Catalyst Research Center, JGC Catalysts and Chemicals Ltd. (2008).
12. Huber, et al., "Renewable Alkanes by Aqueous-Phase Reforming of Biomass-Derived Oxygenates'" Angew. Chem. Int. Ed., 43, 1549 (2004).
13. Huber, et al.; "Production of Liquid Alkanes by Aqueous-Phase Processing of Biomass-Derived Carbohydrates", Science, 308, 1446-1450 (2005).
14. Metzger, "Production of Liquid Hydrocarbons from Biomass," Angew. Chem. Int. Ed., 45, 696 (2006).

The invention claimed is:

1. A hydrotreating process comprising:
   a) mixing a polyol feedstock with a fuel oil feedstock to form a reaction mixture,
   b) reacting the reaction mixture (a) in the presence of a hydrotreating catalyst, and
   c) obtaining one or more light gasses, gasolines, carbon monoxide, carbon dioxide, and mixtures thereof
   wherein said reaction occurs between about 400 and 1000° F., about 150 and 3000 psig, in the presence of hydrogen and a hydrotreating catalyst; and
   further wherein said polyol feedstock comprises at least one of Arabitol, Ribitol, Xylitol, Allitol, Dulcitol, Galactitol, Iditol, Mannitol, Sorbitol, Isomalt, Lactitol, Maltitol, Trehalose, and combinations thereof.

2. The hydrotreating process of claim 1, wherein said fuel oil feedstock is selected from the group consisting of gasoline, jet fuel, kerosene, heating oil, fuel oils, diesel fuel, petro-diesel, biodiesel, synthetic diesel, blended diesel, and combinations thereof.

3. The hydrotreating process of claim 1, wherein said hydrotreating catalyst is selected from the group consisting of cobalt (Co), molybdenum (Mo), nickel (Ni), titanium (Ti), tungsten (W), zinc (Zn), antimony (Sb), bismuth (Bi), cerium (Ce), vanadium (V), niobium (Nb), tantalum (Ta), chromium (Cr), manganese (Mn), rhenium (Re), iron (Fe), platinum (Pt), iridium (Ir), palladium (Pd), osmium (Os), rhodium (Rh), ruthenium (Ru), and combinations thereof.

4. The hydrotreating process of claim 1, wherein said hydrotreating catalyst is a bimetallic catalyst selected from the group consisting of Co/Mo, Co/W, Ni/Mo, Ni/W, Ti/Mo, Ti/W and combinations thereof.

5. The hydrotreating process of claim 1, wherein said reaction occurs at an approximate temperature of 400° F., 425° F., 450° F., 475° F., 500° F., 525° F., 550° F., 575° F., 600° F., 625° F., 650° F., 675° F., 700° F., 725° F., 750° F., 775° F., 800° F., 825° F., 850° F., 875° F., or 900° F.

6. The hydrotreating process of claim 1, wherein said reaction occurs at an approximate pressure of 500, 550, 600, 650, 700, 750, 800, 850, 900, 950, 1000, 1050, 1100, 1150, 1200, 1250, 1500, 1750, 2000, 2250, 2500, 2750, and 3000 psig.

7. The hydrotreating process of claim 1, wherein said hydrotreating catalyst is an highly active catalyst selected from the group consisting of Co/Mo, Co/W, Ni/Mo, Ni/W, Ti/Mo, Ti/W, Co/Mo/W, Ni/Mo/W, Ti/Mo/W and combinations thereof.

8. A process for converting biomass to gasoline comprising:
   a) liquifying biomass to generate a polyol feedstock,
   b) mixing the polyol feedstock with a fuel oil feedstock to form a reaction mixture,
   c) reacting the reaction mixture (b) in the presence of a hydrotreating catalyst, and
   d) obtaining one or more light gasses, gasolines, carbon monoxide, carbon dioxide, and mixtures thereof
   wherein said reaction occurs between about 400 and 1000° F., about 150 and 3000 psig, in the presence of hydrogen and a hydrotreating catalyst; and
   further wherein said polyol feedstock comprises at least one of Arabitol, Ribitol, Xylitol, Allitol, Dulcitol, Galactitol, Iditol, Mannitol, Sorbitol, Isomalt, Lactitol, Maltitol, Trehalose, and combinations thereof.

9. The process for converting biomass to gasoline of claim 8, wherein said fuel oil feedstock is selected from the group consisting of gasoline, jet fuel, kerosene, heating oil, fuel oils, diesel fuel, petro-diesel, bio-diesel, synthetic diesel, blended diesel, and combinations thereof.

10. The process for converting biomass to gasoline of claim 8, wherein said hydrotreating catalyst is selected from the group consisting of cobalt (Co), molybdenum (Mo), nickel (Ni), titanium (Ti), tungsten (W), zinc (Zn), antimony (Sb), bismuth (Bi), cerium (Ce), vanadium (V), niobium (Nb), tantalum (Ta), chromium (Cr), manganese (Mn), rhenium (Re), iron (Fe), platinum (Pt), iridium (Ir), palladium (Pd), osmium (Os), rhodium (Rh), ruthenium (Ru), and combinations thereof.

11. The process for converting biomass to gasoline of claim 8, wherein said hydrotreating catalyst is a bimetallic catalyst selected from the group consisting of Co/Mo, Co/W, Ni/Mo, Ni/W, Ti/Mo, Ti/W and combinations thereof.

12. The process for converting biomass to gasoline of claim 8, wherein said reaction occurs at an approximate temperature of 400° F., 425° F., 450° F., 475° F., 500° F., 525° F., 550° F., 575° F., 600° F., 625° F., 650° F., 675° F., 700° F., 725° F., 750° F., 775° F., 800° F., 825° F., 850° F. 875° F., or 900° F.

13. The hydrotreating process of claim 8, wherein said reaction occurs at an approximate pressure of 500, 550, 600, 650, 700, 750, 800, 850, 900, 950, 1000, 1050, 1100, 1150, 1200, 1250, 1500, 1750, 2000, 2250, 2500, 2750, and 3000 psig.

14. The process for converting biomass to gasoline of claim 8, wherein said hydrotreating catalyst is an highly active catalyst selected from the group consisting of Co/Mo, Co/W, Ni/Mo, Ni/W, Ti/Mo, Ti/W, Co/Mo/W, Ni/Mo/W, Ti/Mo/W and combinations thereof.

15. A process for converting biomass to gasoline comprising:
   a) liquifying biomass to generate a polyol feedstock and biomass solids
   b) mixing the polyol feedstock with a fuel oil feedstock to form a reaction mixture,
   c) hydrotreating the reaction mixture (b) in the presence of a hydrotreating catalyst, wherein said reaction occurs between about 400 and 1000° F., and between about 500 and 3000 psig, in the presence of hydrogen and a hydrotreating catalyst
   d) obtaining one or more light gasses, gasolines, carbon monoxide, carbon dioxide, and mixtures thereof, and
   e) reforming biomass solids from (a) and light gasses (d) to generate H2 and COX, wherein said $H_2$ generated by reforming (e) is part of the hydrogen consumed during hydrotreating (c); and
   further wherein said polyol feedstock comprises at least one of Arabitol, Ribitol, Xylitol, Allitol, Dulcitol, Galactitol, Iditol, Mannitol, Sorbitol, Isomalt, Lactitol, Maltitol, Trehalose, and combinations thereof.

16. The process for converting biomass to gasoline of claim 15, wherein said fuel oil feedstock is selected from the group consisting of gasoline, jet fuel, kerosene, heating oil, fuel oils, diesel fuel, petro-diesel, bio-diesel, synthetic diesel, blended diesel, and combinations thereof.

17. The process for converting biomass to gasoline of claim 15, wherein said hydrotreating catalyst is selected from the group consisting of cobalt (Co), molybdenum (Mo), nickel (Ni), titanium (Ti), tungsten (W), zinc (Zn), antimony (Sb), bismuth (Bi), cerium (Ce), vanadium (V), niobium (Nb), tantalum (Ta), chromium (Cr), manganese (Mn), rhenium (Re), iron (Fe), platinum (Pt), iridium (Ir), palladium (Pd), osmium (Os), rhodium (Rh), ruthenium (Ru), and combinations thereof.

18. The process for converting biomass to gasoline of claim 15, wherein said hydrotreating catalyst is a bimetallic catalyst selected from the group consisting of Co/Mo, Co/W, Ni/Mo, Ni/W, Ti/Mo, Ti/W and combinations thereof.

19. The process for converting biomass to gasoline of claim 15, wherein said reaction occurs at an approximate temperature of 400° F., 425° F., 450° F., 475° F., 500° F., 525° F., 550° F., 575° F., 600° F., 625° F., 650° F., 675° F., 700° F., 725° F., 750° F., 775° F., 800° F., 825° F., 850° F., 875° F., or 900° F.

20. The process for converting biomass to gasoline of claim 15, wherein said reaction occurs at an approximate pressure of 500, 550, 600, 650, 700, 750, 800, 850, 900, 950, 1000, 1050, 1100, 1150, 1200, 1250, 1500, 1750, 2000, 2250, 2500, 2750, and 3000 psig.

21. The process for converting biomass to gasoline of claim 15, wherein said hydrotreating catalyst is an highly active catalyst selected from the group consisting of Co/Mo, Co/W, Ni/Mo, Ni/W, Ti/Mo, Ti/W, Co/Mo/W, Ni/Mo/W, Ti/Mo/W and combinations thereof.

* * * * *